United States Patent [19]
Bricmont

[11] Patent Number: 4,577,384
[45] Date of Patent: Mar. 25, 1986

[54] METHOD FOR JOINING TOGETHER HEATED WORKPIECES FOR PROCESSING IN A ROLLING MILL

[76] Inventor: Francis H. Bricmont, 905 Bridgewater Dr., Pittsburgh, Pa. 15206

[21] Appl. No.: 604,901

[22] Filed: Apr. 27, 1984

[51] Int. Cl.$^4$ .............................................. B23P 19/04
[52] U.S. Cl. .................................... 29/460; 228/158; 164/108
[58] Field of Search ...................... 29/445, 33 B, 33 C, 29/460; 228/158, 66.1; 164/108, 100, 348, 66.1; 72/269; 425/117, 121, 123; 264/248, 261, 262, 263

[56] References Cited

U.S. PATENT DOCUMENTS 545,040   8/1895  Hoffman et al. .................... 164/100
4,009,749 3/1977  Alberny .............................. 164/348
4,291,743 9/1981  Aftalion ............................. 164/66.1
4,294,394 10/1981 Iida ................................... 228/158

FOREIGN PATENT DOCUMENTS 697188 11/1964 Canada ............................... 164/108

Primary Examiner—Howard N. Goldberg
Assistant Examiner—Leonard S. Selman
Attorney, Agent, or Firm—Thomas H. Murray; Clifford A. Poff

[57] ABSTRACT

While the leading end of a first heated workpiece is processed in a rolling mill, the trailing end is joined to the leading end of a second heated workpiece. End portions of the workpieces at the gap therebetween are held by clamp members at a spaced-apart location so that both workpieces advance at the same speed toward the rolling mill. The end portions of the workpieces are cleaned to remove scale and then a mold is positioned to span the gap and contact the end parts of the workpieces. Liquid-weld metal is introduced into the mold and allowed to at least partially solidify before the mold is removed while the rolling operation continues. The weld metal substantially solidifies and is passed through the rolling mill.

12 Claims, 5 Drawing Figures 4,577,384

METHOD FOR JOINING TOGETHER HEATED WORKPIECES FOR PROCESSING IN A ROLLING MILL

BACKGROUND OF THE INVENTION

This invention relates to joining together heated workpieces for processing in a rolling mill or the like, and more particularly, to joining together heated workpieces to form a continuous stream of a predetermined number of individual workpieces by introducing a quantity of liquid-weld metal into a predetermined gap established between the ends of two workpieces and allowing the weld metal to solidify while the workpieces are advanced continuously and while the forward end of the leading workpiece is processed in a rolling mill.

In the past, it was a practice to roll a workpiece, e.g., a bloom in a billet mill and then without reheating the workpiece, roll the workpiece, e.g., a billet in a bar mill. However, in some rolling operations a reheat furnace was used to heat the billet after rolling in the billet mill before the rolling operations continued in the bar mill. The use of a reheat furnace greatly reduces the wide temperature range and, therefore, reduces the harmful affects to the billet material before completion of the rolling operation. More recently, workpieces for processing in a bar mill are produced with a desired cross section by a continuous-casting facility. A reheat furnace is used to heat desired lengths of the continuous-cast workpieces for rolling in a bar mill. The selection of the workpieces which are fed to a bar mill is based on a desired length of the rolled product which can be coiled or straight products that are subdivided into convenient lengths. However, it is necessary to compensate for a loss of yield, i.e., the loss of salable product due to the cropped end losses and cobbles. A cobble occurs when the workpiece fails to pass along an intended course of travel between rolling mill stands in a given rolling mill installation. These losses are heretofore common because crop shears are used to cut a length of material from the leading end and sometimes the trailing end of the workpiece. With a continuous strand of billets, these leading edges are minimized, thereby reducing a loss of yield due to cobbles.

The length of the workpiece fed to the reheat furnace usually varies and a particular length is selected to satisfy a desired preselected shape and length of the final rolled product. Extensive inventory control and scheduling efforts are needed as well as the requirement to handle the variable lengths of the workpieces. This has a particularly adverse affect on the operation of the reheat furnace because the different lengths of the workpieces cover less than the maximum hearth area which reduce productivity as well as increase the cost of fuel.

To overcome these problems, the present invention provides a process for joining together workpieces in an end-to-end relationship after heating in a reheat furnace for continuous processing in a rolling mill or the like. Any preselected number of workpieces, such as billets, can be joined together for rolling a product having a desired shape and length after which the length of the continuously-rolled product is subdivided into required lengths. This minimizes losses due to cropping and reduces the probability of cobbles and other losses to the yield of the workpiece material. Moreover, the process enables charging workpieces having a uniform length into a reheat furnace to maximize fuel efficiency and minimize scheduling an inventory control.

SUMMARY OF THE INVENTION

It is an object of the present invention to provide a process for joining together heated workpieces in an end-to-end relationship by introducing a liquid-weld material into a predetermined gap between the ends of heated workpieces and allowing the liquid-weld material to at least partly solidify.

More particularly, according to the present invention there is provided a method of joining together heated workpieces for processing in a rolling mill by the step of moving the leading end of a second heated workpiece into closely-spaced relation with a trailing end of a first heated workpiece on a conveyor, maintaining a predetermined gap between the leading end of the second workpiece and the trailing end of the first workpiece while the workpieces are continuously advanced by the conveyor, arranging a mold to span the predetermined gap and surround peripheral end portions of the workpieces, feeding liquid material to the mold to essentially fill the predetermined gap with liquid-weld metal, joining the first and second heated workpieces together by allowing the liquid-weld metal to at least partly solidify, and removing the mold from the workpieces.

It is preferred according to the method of the invention to clean end portions of the workpieces to remove scale and other impurities before positioning of the mold. The cleaned ends of the workpieces are maintained in an inert atmosphere to prevent oxidation. The liquid-weld metal which is introduced into the gap between the closely-spaced ends of the workpieces is fed through a shielding envelope in which an inert atmosphere is also maintained.

The mold preferably has a heat-resistant lining, e.g., refractory, carried by a water-cooled jacket so that after introduction of the weld metal into the gap between the closely-spaced ends of the workpieces, sufficient heat can be withdrawn by circulating water in the jacket to insure solidification of the weld metal, while at the same time, avoid creating cold spots by chilling the workpieces. A leading end portin of the first workpiece is preferably undergoing processing in a rolling mill throughout the time while the trailing end thereof is joined to the leading end of the second workpiece by weld metal. In this way, there is no need to lengthen the mill entry table or reposition the furnace relative to the rolling mill stand, particularly because the entry speed of the workpiece of the rolling mill stand of a billet mill is relatively slow and permits sufficient time for the joining process.

These features and advantages of the present invention as well as others will be more fully understood when the following description is read in light of the accompanying drawings, in which:

FIG. 3 is a fragmentary view of a disappearing roller for a roller table forming part of the apparatus shown in FIG. 1;

Figure 1:
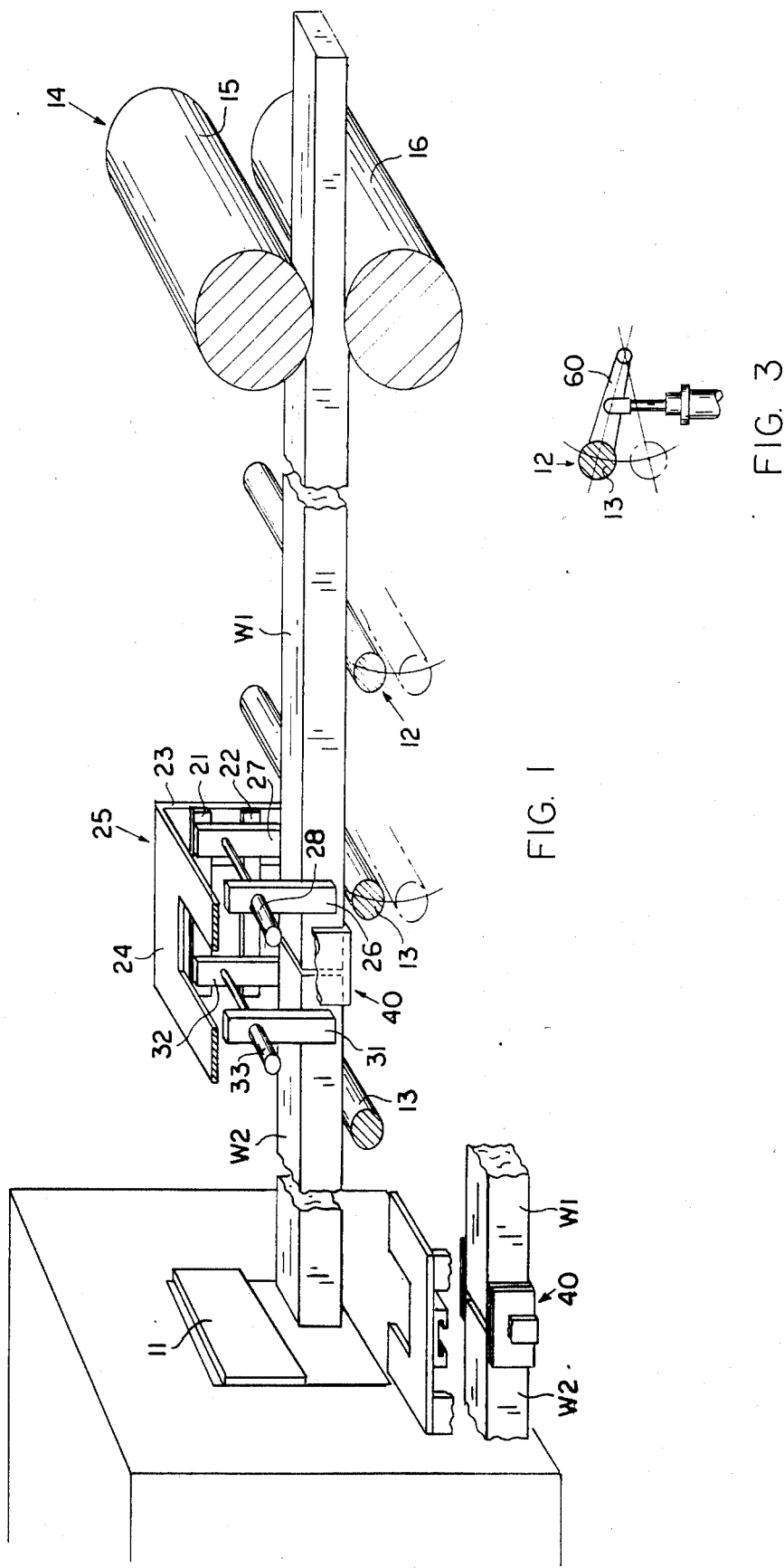
FIG. 1 is an isometric view of apparatus to carry out the method of the present invention.
Figure 2:
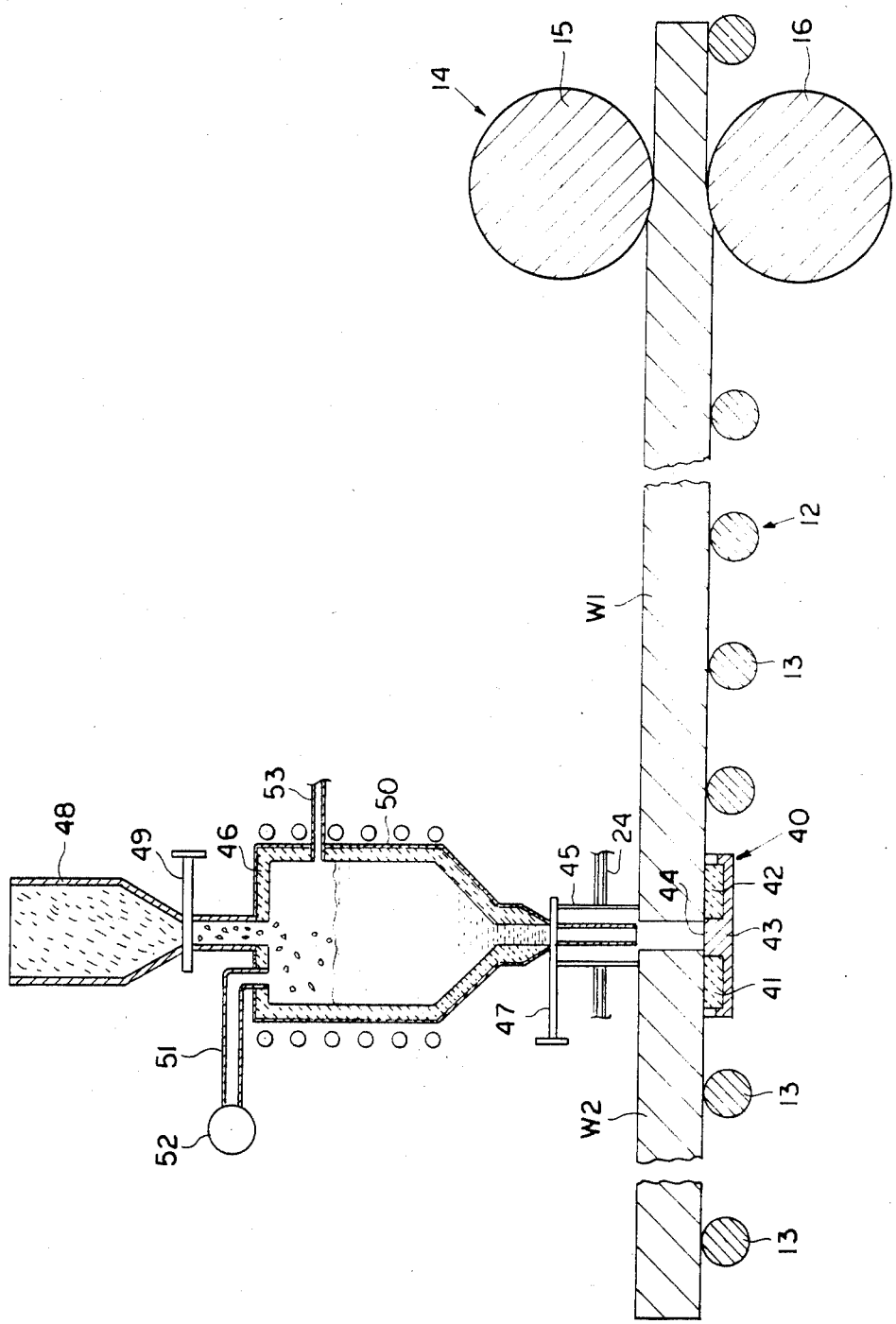
FIG. 2 is an elevational view, partly in section, to particularly illustrate the manner by which liquid-weld metal is supplied for joining together workpieces.

In FIGS. 1 and 2, there is illustrated a portion of a typical reheat furnace which includes, as well known in the art, a hearth along which workpieces are advanced in side-by-side relationship from an entry end to a discharge end which is normally closed by a door. For example, after a workpiece is heated to a desired rolling temperature in the furnace, it is discharged from the furnace by first opening a door 11 and a similar door at the opposite side of the furnace and then engaging the workpiece with a pusher to discharge the workpiece from the furnace and onto a roller table 12 having a plurality of driven rollers 13.

For the purpose of the following description, let it be assumed that the first of a series or plurality of workpieces, e.g., billets, which are to be joined together in an end-to-end relationship according to the method of the present invention has been ejected from the furnace onto the roller table and advance thereby to the entry side of a first rolling mill stand 14 of a plurality of rolling mills. The leading end of this first workpiece is fed into the gap between rolls 15 and 16 and undergoes processing thereby. This workpiece has been designated in the drawings by reference numeral W1. While processing in the rolling mill, the trailing end of the workpiece continually advances toward the rolling mill stand.

A second workpiece, W2, is removed from the reheat furnace and conveyed by the roller table 12. The rollers of this table may each be driven, preferably by an individual motor, or in any manner that is, per se, well known in the art. The speed of the individual motors coupled to the rollers can be controlled so as to advance workpiece W2 at a different rate of speed than workpiece W1 is advanced into the rolling mill. Workpiece W2 may, however, be advanced by an independent mechanism through a distance which is sufficient to establish a closely-spaced relationship between the trailing end of workpiece W1 and the leading end of workpiece W2. Such a mechanism is shown schematically in FIG. 1 and forms part of a suitable apparatus for other functions to carry out the method of the present invention. This mechanism as shown in FIG. 1, takes the form of an upstanding structure having two side rails that are spaced apart to extend along opposite sides of roller table 12. The side rails are identified by reference numerals 21 and 22. The side rails are attached to a crosshead 24 of a base 25 that includes a depending leg section 23 at one side of the base. The leg section extends downwardly at one side of the table where it is supported along a linear guide such as rails and coupled to an actuator such as a piston and cylinder assembly, not shown in FIG. 1, to advance the base along the roller table at a speed that is independent of the operation of the driven rollers. The rails 21 and 22 extend in the direction of a roller table and support a pair of clamp arms 26 and 27 that can be moved toward and away from opposite sides of a trailing end of workpiece W1 under a clamping force developed by an actuator 28 such as a piston and cylinder assembly. A second pair of clamp arms 31 and 32 is similarly arranged at opposite ends of rails 21 and 22. These arms are connected to an actuator 33 such as a piston and cylinder assembly to apply a clamping force on the arms for engaging a leading end portion of workpiece W2.

After workpiece W2 is ejected from the furnace onto the roller table, clamp arms 31 and 32 are brought into engagement with opposite sides of the leading end of workpiece W2. The actuator for base 25 is then actuated to advance the base 25 toward the rolling mill stand, thereby pulling the leading end of workpiece W2 toward workpiece W1 until a predetermined gap exists between the ends of these workpieces. Thereupon, clamps 26 and 27 are brought into engagement with opposite sides of the trailing end of workpiece W1. As soon as the two workpieces are clamped together the entire combination of the base and workpieces moves together at a speed established by the rolling of workpiece W1 in the rolling mill.

Figure 4:
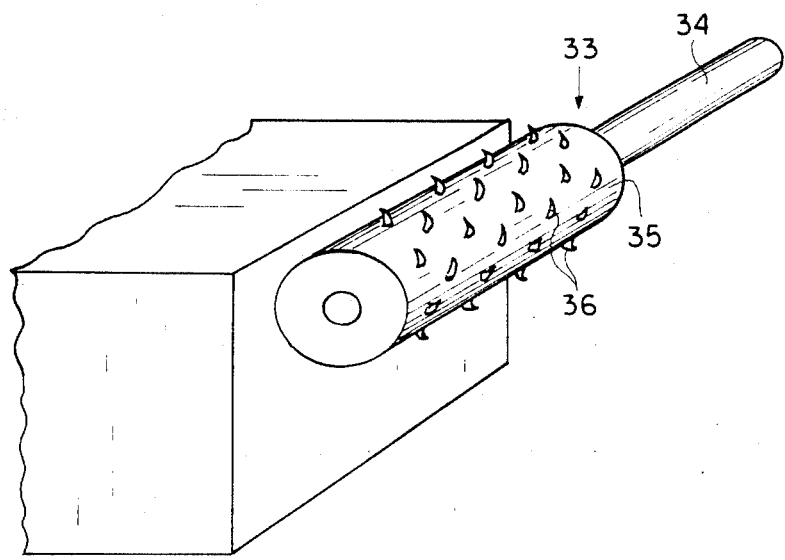
FIG. 4 is an isometric view of a rotary scale cleaning device forming part of the apparatus to carry out the present invention.

At this point in the process or prior thereto, it is then preferred to clean the end portions of the workpieces to remove scale and other impurities. The descaling device, per se, known in the art, is shown schematically in FIG. 4 of the drawings as a rotary cleaner 33, although nozzles for directing streams of high-pressure water to end portions of the workpieces can be used. Mechanical, chemical, hydraulic or pneumatic means may be utilized for removing scale. As shown in FIG. 4, the rotary cleaner 33 includes an arbor 34 driven by a suitable motor, not shown, and supported by leg section 23. The arbor is connected to a drum 35 that carries a multitude of elements 36, such as scraper blades, extending from the periphery of the drum. It is preferred to descale the end surfaces of the workpieces which are held in confronting relationship as well as portions of the side surfaces of the workpieces along a short distance from their ends to avoid scale inclusions in the weld metal that may solidify in this area during the operation when liquid-weld metal is introduced into the gap between the ends of the workpieces. More specifically, a thin skin of weld metal may leak past the mold surfaces while engaged with the workpiece but this weld metal will flake off with scale adjacent thereto upon processing in the rolling mill. However, it is to be understood that it is not necessary according to the present invention that the liquid-weld metal solidify on the outer peripheral surfaces of the end portions of the workpieces.

Figure 5:
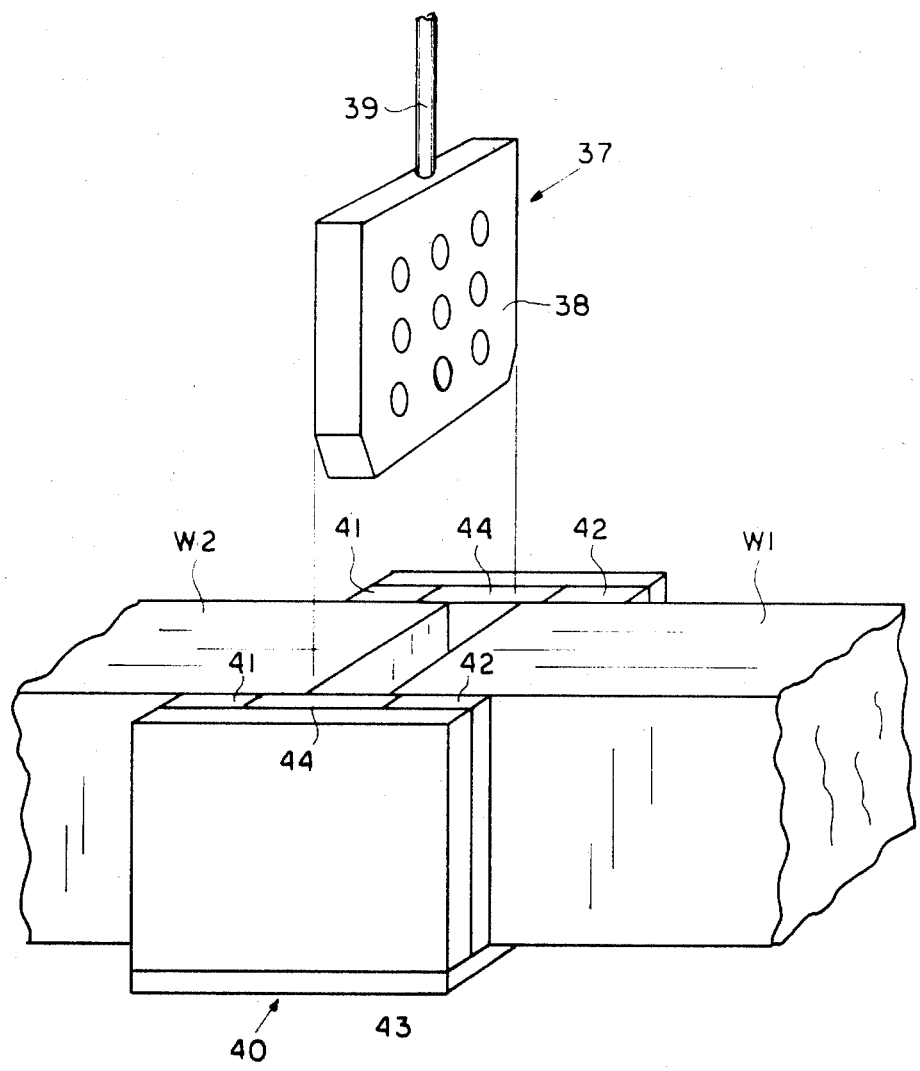
FIG. 5 is an isometric view of a device to maintain a deoxidizing atmosphere at cleaned ends of the workpieces until the introduction of liquid-weld metal.

An inert atmosphere is preferably maintained by a device 37, shown in FIG. 5, after removal of the scale and other impurities from the ends and adjacent side surfaces of the workpieces and while the gap between the ends of the workpieces is enclosed within a mold assembly 40. The device 37 includes an imperforated plate 38 having holes in opposite sides of the plate communicating with a supply pipe 39 that is vertically positioned by an actuator, not shown. The imperforated plate is moved into the gap between the ends of the workpieces. The supply pipe 39 is connected to a supply of reducing gas, such as hydrogen. Hydrogen gas is preferred which will reduce the various $Fe_xO_y$ compounds to $Fe + H_2O$. The water vapor is purged with argon gas which is also introduced through the openings in the imperforated plate and leaves only Fe to go into solution with the weld metal to be subsequently introduced into the gap between the workpieces. The mold assembly 40 is comprised of sections that are linked or constructed to be brought together to form a tubular cavity in which the end portions of the workpieces reside. As shown in FIG. 2, the mold assembly includes two liners 41 and 42 made of heat-resistant material arranged at spaced-apart locations to engage with the outer peripheral surfaces of the end portions of the workpieces. A metal support 43 includes a chill liner 44 made of copper or other high-heat conductive material. Chill liner 44 contacts only narrow peripheral parts of the workpieces W1 and W2 and spans the gap between the workpieces. The chill liner 44 is provided with passageways for coolant water. An opening 45 at the top of the mold communicates with a delivery spout of a vessel 46 from which the delivery of liquefied weld metal is controlled by a slide gate valve 47. The fall space for the stream of liquid-weld metal is surrounded by a sheathing which is connected to an inert gas supply such as argon for maintaining an inert atmosphere in the sheathing as well as within the mold during delivery of liquid-weld metal to the gap between the workpieces. The vessel 46 is part of a liquid-weld, metal-producing unit supported by crosshead 24 and can be moved by an actuator such as a piston and cylinder assembly, not shown, into an operative position in which the mold surrounds the gap between the workpieces. The vessel receives a supply of granular metal from a hopper 48 through slide gate valve 49. The vessel has a refractory lining supported by a metal shell that is encircled by an induction coil 50. A conduit 51 is connected to an opening in the top of the vessel for applying a vacuum developed by a pump 52.

Induction heating is carried out through the use of the coil to liquefy raw material introduced into the vessel under a partial vacuum. It is preferred to include as part of the supply of raw material, a material which forms slag that will float on top of the liquid-weld metal to prevent oxidation. Periodically, the slag is skimmed off through an opening forming a slag chute 53 in the side of the vessel. The induction coils are controlled in a manner, per se, well known in the art to maintain the temperature of the liquid-weld material within a desired range.

As shown in FIG. 3, the rollers 13 of roller table 12 drop downwardly from the pass line of the workpiece to avoid obstruction with the mold assembly 40. The rollers along a preselected length of the table where joining of the workpieces occurs are supported by pivot arms 60 which support bearing assemblies at opposite ends of the rollers. The pivot arms are controlled by actuators, e.g., piston and cylinder assemblies, to move the rollers out of interfering contact with the mold assembly while advance beyond the rollers.

When the liquid-weld metal is introduced into the gap between the ends of the workpieces, additional heat is supplied to the workpieces. Part of the added heat is immediately withdrawn by operation of the water coolant in the mold. A further part of the added heat is dissipated into the end portions of the workpieces. This reheating of the end parts of the workpieces compensates for a slight cooling thereof due to convection cooling and the descaling operation. The temperature of the liquid-metal weld is selected so that with these heat losses, the liquid-weld metal will cool sufficiently to form at least a partially-solidified mass of weld metal in the gap between the workpieces. Sufficient quantities of heat must be dissipated to avoid solidifying the end portions of the workpieces. Withdrawal of too much heat will cause a cold spot. After the weld metal has solidified to a predetermined extent, usually before the core solidifies, the mold is removed from the workpieces and the clamps are disengaged so that the base 25 can be returned in a direction toward the furnace for again joining together the subsequent workpieces. As will now be understood to those skilled in the art, the welding operation for joining together workpieces is carried out in a relatively short period of time. There will be a sufficient dwell period before the weld joint passes into the gap between the rolls of the rolling mill so that substantially complete solidification of the weld metal occurs before rolling. The weld metal is comprised of metal which, when solidified, has a composition and strength equal to the metal of the workpieces as will not be apparent to those skilled in the art.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A method for joining together heated workpieces for processing in a rolling mill, said method including the steps of:
    moving the leading end of a second heated workpiece in closely-spaced relation with a trailing end of a first heated workpiece on a conveyor,
    maintaining a predetermined gap between the leading end of the second workpiece and the trailing end of the first workpiece while the first and second workpieces are continually advanced by said conveyor,
    arranging a mold to span and seal said predetermined gap by surrounding peripheral end portions of said first and second workpieces,
    feeding liquid-weld metal to said mold to essentially only fill said predetermined gap with the liquid-weld metal,
    joining the first and second heated workpieces together by allowing the liquid-weld metal to at least partially solidify, and
    removing the mold from the workpieces.

2. The method according to claim 1 including the further step of processing the leading end of said first heated workpiece in a rolling mill concurrently with said step of maintaining a predetermined gap.

3. The method according to claim 1 including the further step of cleaning said leading end of the second workpiece and said trailing end of the first workpiece on said conveyor before said step of arranging a mold.

4. The method according to claim 3 including the further step of maintaining a non-oxidized atmosphere in said predetermined gap about said leading end of the second workpiece and said trailing end of the first workpiece after said step of cleaning and during said step of feeding.

5. The method according to claim 1 wherein said step of maintaining a predetermined gap includes clamping a trailing end part of the first heated workpiece and a leading end part of said second workpiece to a spacer.

6. The method according to claim 1 wherein said step of arranging a mold includes cooling end parts of the heated workpieces to facilitate solidification of the liquid-weld metal.

7. The method according to claim 1 wherein said step of arranging a mold includes engaging the end portions of the heated workpieces with a water-cooled, refractory-lined mold.

8. The method according to claim 1 including the further step of processing the trailing end of the first workpiece and the leading end of the second workpiece in a rolling mill after removing the mold therefrom.

9. The method according to claim 1 wherein said weld metal has a composition which will form a weld joint having a structure and strength at least equal to the metal of the workpieces.

10. The method according to claim 1 wherein said step of feeding liquid-weld metal includes directing a stream of weld metal from an induction-heated, refractory-lined vessel through an inert atmosphere into said mold.

11. The method according to claim 10 including feeding inert gas into a shielded enclosure for maintaining said inert atmosphere.

12. The method according to claim 1 wherein said workpiece is discharged from a reheat furnace onto said conveyor.

* * * * *